(12) United States Patent
Cressman et al.

(10) Patent No.: US 12,503,054 B2
(45) Date of Patent: Dec. 23, 2025

(54) ACTIVE AERODYNAMICS FOR FOOT STEP

(71) Applicant: Toyota Motor Engineering & Manufacturing North America, Inc., Plano, TX (US)

(72) Inventors: Daniel J.F. Cressman, Ypsilanti, MI (US); Ulan M. Thompson, Saline, MI (US); Ryan C. Harris, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 329 days.

(21) Appl. No.: 18/242,403

(22) Filed: Sep. 5, 2023

(65) Prior Publication Data
US 2025/0074313 A1    Mar. 6, 2025

(51) Int. Cl.
*B60R 3/02*    (2006.01)
*B62D 35/00*    (2006.01)
*B62D 35/02*    (2006.01)

(52) U.S. Cl.
CPC .............. *B60R 3/02* (2013.01); *B62D 35/005* (2013.01)

(58) Field of Classification Search
CPC ............ B60R 3/02; B60R 3/00; B62D 35/005
See application file for complete search history.

(56) References Cited

U.S. PATENT DOCUMENTS

| | | | |
|---|---|---|---|
| 4,159,122 A | 6/1979 | Stevens | |
| 4,274,648 A | 6/1981 | Robins | |
| 4,750,753 A | 6/1988 | Dezern | |
| 5,139,295 A | 8/1992 | Escobedo | |
| 5,538,265 A | 7/1996 | Chen et al. | |
| 5,678,872 A | 10/1997 | Slater | |
| 6,840,526 B2 | 1/2005 | Anderson et al. | |
| 7,219,910 B2 | 5/2007 | Dunford | |
| 8,887,845 B2* | 11/2014 | McDonald | B62D 35/005 296/180.5 |
| 9,308,870 B2 | 4/2016 | Yang et al. | |
| 9,403,487 B1 | 8/2016 | Diehl et al. | |
| 10,155,551 B2* | 12/2018 | Miller | B62D 35/005 |
| 10,562,456 B2 | 2/2020 | Lynch et al. | |

(Continued)

FOREIGN PATENT DOCUMENTS

WO    1994001306 A1    1/1994

*Primary Examiner* — John D Walters
(74) *Attorney, Agent, or Firm* — Snell & Wilmer LLP

(57) ABSTRACT

Methods, systems, and apparatus for a vehicle aerodynamic system include an air dam adapted to be mounted adjacent a front bumper of a vehicle. The air dam can be moveable between a stowed position (e.g., when the vehicle is operating at higher speeds) and a deployed position (e.g., when the vehicle is operating at lower speeds). The air dam includes an air dam panel moveable between the stowed position and a step position. In the step position, the air dam panel is configured as a step for a user to access a front vehicle compartment. The aerodynamic system can include an actuator configured to move the air dam panel relative to the front bumper. The aerodynamic system can further include a controller in electronic communication with a front hood position sensor that is configured to automatically deploy the step based upon a position of the front hood.

20 Claims, 6 Drawing Sheets

(56) References Cited

U.S. PATENT DOCUMENTS

| | | |
|---|---|---|
| 10,676,033 B1 | 6/2020 | Carr et al. |
| 10,926,705 B2 | 2/2021 | Hoffman et al. |
| 2009/0273196 A1 | 11/2009 | Ayabe et al. |

* cited by examiner

ACTIVE AERODYNAMICS FOR FOOT STEP

BACKGROUND

Field

The present disclosure relates to vehicles having a front trunk or engine compartment and more particularly to user access to the front trunk or engine compartment.

Description of the Related Art

Most vehicles include a front trunk or a front engine compartment. The vehicle may have a front trunk due to the engine being located other than under a hood at the front of the vehicle, or due to the vehicle operating as a battery electric, in which case there is no engine under the hood. In particular vehicle models, there may be customer options for an engine-based powertrain (gasoline, diesel, etc.), a hybrid electric powertrain, or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. In both cases, the vehicle typically has a front compartment that is covered by a hood.

Accordingly, it is desirable to provide systems, methods, and techniques for ease of access to this front compartment area (whether trunk or engine compartment).

SUMMARY

In general, one aspect of the subject matter described in this disclosure may be embodied in a vehicle air dam system. The vehicle air dam system can include a front hood for covering a vehicle compartment, the front hood is rotatable between a closed position and an open position. The vehicle air dam system can further include an air dam including a first air dam panel adapted to be mounted adjacent a front bumper of a vehicle. The vehicle air dam system can further include an actuator operatively coupled to the first air dam panel and configured to move the first air dam panel relative to the front bumper. The vehicle air dam system can further include a front hood position sensor configured to detect a position of the front hood. The vehicle air dam system can further include an electronic control unit electrically coupled to the front hood position sensor. The electronic control unit can be configured to receive a first front hood position signal indicating that the front hood is no longer in a closed position, and, in response to receiving the first front hood position signal, control the actuator to move the first air dam panel from a first position to a second position wherein the first air dam panel is configured as a step for a user to access the vehicle compartment.

These and other embodiments may optionally include one or more of the following features. The first position can be an aerodynamic position, in which the first air dam panel at least partially extends a distance below a bottom surface of the front bumper to reduce airflow beneath the vehicle. The first position can be a stowed position, in which the first air dam panel is at least partially concealed by the front bumper. The first air dam panel can be configured to rotate about a pivot between the first position and the second position. The air dam can further include a second air dam panel adapted to be mounted adjacent the front bumper, and the first air dam panel is moveable with respect to the second air dam panel. The second air dam panel can be configured to move between an aerodynamic position, in which the second air dam panel at least partially extends a distance below the bottom surface of the front bumper to reduce airflow beneath the vehicle, and a stowed position, in which the second air dam panel is at least partially concealed by the front bumper. The first air dam panel can be immediately adjacent to the second air dam panel when the first air dam panel and the second air dam panel are both in the aerodynamic position. The first air dam panel can be configured to move with respect to the second air dam panel when the first air dam panel moves to the step position. The air dam can further include a third air dam panel adapted to be mounted adjacent the front bumper, the first air dam panel is moveable with respect to the third air dam panel, and the first air dam panel is located between the second air dam panel and the third air dam panel. The electronic control unit can be further configured to receive a second front hood position signal indicating that the front hood is in the closed position, and, in response to receiving the second front hood position signal, control the actuator to move the first air dam panel from the second position to a stowed position.

In another aspect, the subject matter may be embodied in a method of controlling an air dam for a vehicle. The method can include receiving, by a processor, a first front hood position signal indicating that the front hood is no longer in a closed position. The method can further include, in response to receiving the first front hood position signal, controlling, by the processor, an actuator to move a first air dam panel from a first position to a second position wherein the first air dam panel is configured as a step for a user to access a vehicle compartment.

These and other embodiments may optionally include one or more of the following features. The method can further include receiving, by the processor, a second front hood position signal indicating that the front hood is in the closed position. The method can further include, in response to receiving the second front hood position signal, controlling, by the processor, the actuator to move the first air dam panel from the second position to a stowed position. The step of controlling the actuator to move the first air dam panel from the first position to the second position can include rotating the first air dam panel about a pivot. The step of controlling the actuator to move the first air dam panel from the first position to the second position can include rotating the first air dam panel with respect to a second air dam panel. The step of controlling the actuator to move the first air dam panel from the first position to the second position can include rotating the first air dam panel forward and downward. The step of controlling the actuator to move the first air dam panel from the first position to the second position can include rotating the first air dam panel forward and upward.

In another aspect, the subject matter may be embodied in a vehicle air dam system. The vehicle air dam system can include an air dam including a first air dam panel adapted to be mounted adjacent a front bumper of a vehicle, the first air dam panel is configured to move between an aerodynamic position, in which the first air dam panel at least partially extends a distance below a bottom surface of the front bumper to reduce airflow beneath the vehicle, and a step position, wherein the first air dam panel is configured as a step.

These and other embodiments may optionally include one or more of the following features. The first air dam panel can be further configured to move to a stowed position, in which the first air dam panel is at least partially concealed by the front bumper. The first air dam panel can be configured to rotate about a pivot between the aerodynamic position and the step position. The vehicle air dam system can further include a second air dam panel adapted to be mounted adjacent the front bumper, the second air dam panel is configured to move between the aerodynamic position, in which the second air dam panel at least partially extends a distance below the bottom surface of the front bumper to reduce airflow beneath the vehicle, and a stowed position, in which the second air dam panel is at least partially concealed by the front bumper. The first air dam panel can be located immediately adjacent to the second air dam panel when the first air dam panel and the second air dam panel are both in the aerodynamic position, and the first air dam panel is configured to move with respect to the second air dam panel when the first air dam panel moves to the step position.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 6:
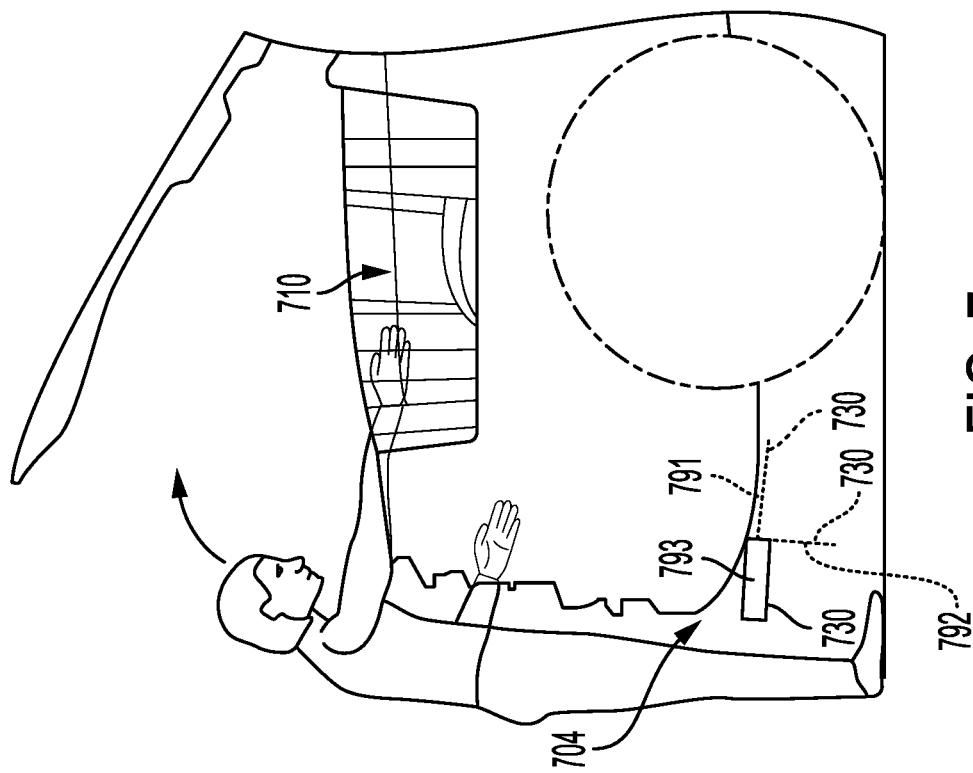
FIG. 6 is a schematic side view of a vehicle including an aerodynamic system including a multi-panel air dam moveable between a stowed position, a deployed position, and a step position, wherein an air dam panel is hinged at a bottom edge thereof, according to an aspect of the invention.
Figure 7:
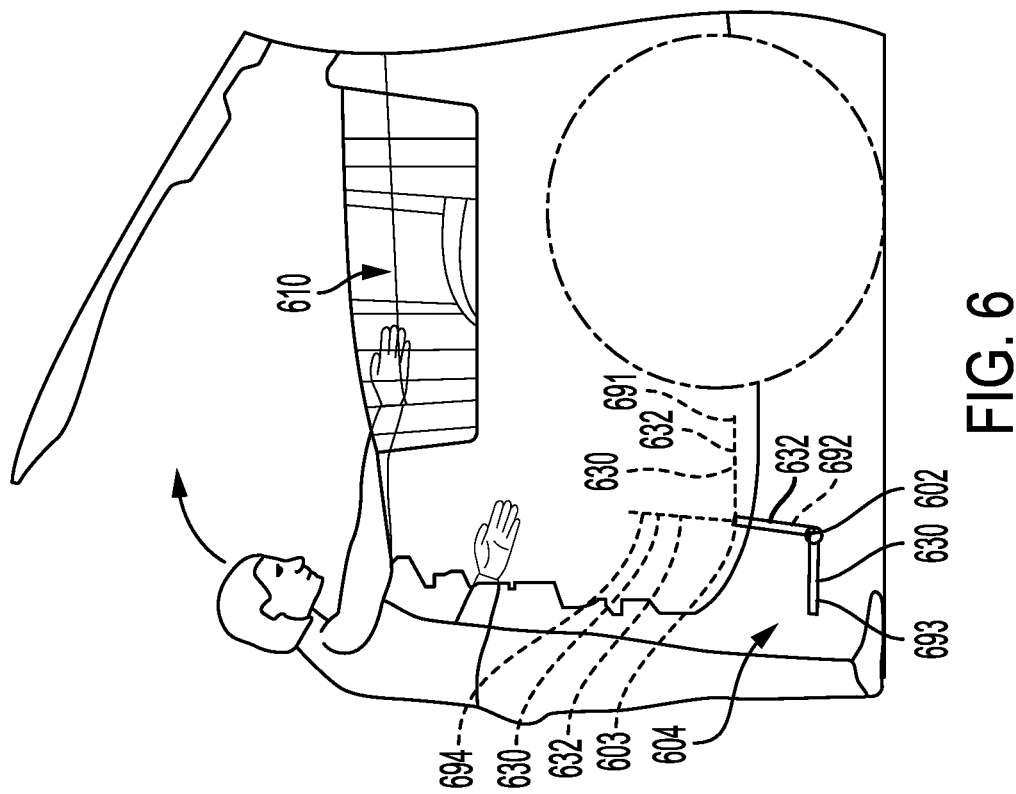
FIG. 7 is a schematic side view of a vehicle including an aerodynamic system including a multi-panel air dam moveable between a stowed position, a deployed position, and a step position, wherein an air dam panel is hinged at a top edge thereof, according to an aspect of the invention.

Disclosed herein are systems, methods, devices, and/or vehicles for implementing an adjustable front air dam that includes an air dam panel/step configured to rotate to a step position whereby a user can step up onto the air dam panel/step to better access a front compartment of a vehicle. Aspects and/or embodiments are directed to providing an active air dam that includes a rotatable portion to form a step that allows a user to reach into a front compartment of a vehicle. In various embodiments, a vehicle includes a vehicle body, a front storage compartment provided at a front end of the vehicle body, an active air dam provided at a lower end of the front end of the vehicle body proximate the front storage compartment. The active air dam is operable between a deployed position and a stowed position. In various embodiments, the active air dam includes a rotatable air dam panel rotatable relative to a pair of stationary air dam panels provided on opposite sides of the rotatable air dam panel. The rotatable air dam panel can be rotatable relative to the side air dam panels via a hinge. In various embodiments, the hinge can be provided at a bottom edge of the side air dam panels, as shown in FIG. 6, or a top edge of the side air dam panels, as shown in FIG. 7, in accordance with various embodiments. The rotatable air dam panel/step rotates relative to the side air dam panels to form a step onto which a user may step to reach an interior of a front storage compartment (e.g., a frunk or engine compartment) of the vehicle. In various embodiments, the rotatable air dam panel/step may automatically rotate relative to the side active aerodynamic portions when a lid or hood to the front storage compartment is opened.

Particular embodiments of the subject matter described in this disclosure may be implemented to realize one or more of the following advantages. The active aerodynamic system can include a processor configured to monitor a position of the front compartment hood/lid and deploy the air dam panel/step to the step position in response to the hood/lid being moved toward the open position. Accordingly, a user is automatically provided better access to the front compartment. In various embodiments, the air dam panel/step can be particularly useful for smaller-statured users to reach into the front compartment of the vehicle without having to obtain a step stool or other object to gain better access. Moreover, the processor can be configured to automatically control the air dam panel/step to move to a stowed position in response to detecting that the front compartment hood/lid has been returned to the closed position.

A front air dam can be installed on the front-end of a vehicle and appears as an extension to the bottom of the front bumper. The air dam can be rigid to prevent unwanted deflection of the air dam and can extend parallel to the ground. Support rods can be attached to the air dam panel(s) to ensure the front air dam remains parallel to the ground. Depending on its positioning, a front air dam can limit how much air is directed under the vehicle by slicing through the incoming air stream and directing a portion of the airflow over the vehicle body. A front air dam can be helpful in preventing front end lift as well as providing downward force on the vehicle. The overall reduced lift and increased down force is created by the air dam restricting airflow along the underbody of the vehicle.

To understand how a front air dam prevents lift and creates downward force it is helpful to understand the fluid dynamics as oncoming air approaches the front of a vehicle. When oncoming air reaches the front of the vehicle it must slow or come to a stop before it turns to move either up and over, down and under, or around the vehicle. Thus, the front of the moving vehicle is an area of relatively high pressure. The relatively high pressure at the front of a moving vehicle pushes back on the vehicle creating drag. A front air dam can extend below the bumper close to the road and air flowing underneath the front air dam and vehicle creates somewhat of a Venturi effect, based on Bernoulli's equation, where pressure is decreased as air is forced through a constriction and speeds up in velocity. Thus, the region between the air dam and the pavement is an area of low pressure. This adds up to a downward force on the air dam. The resultant dynamic downward force generally helps the driver to retain control of the vehicle at higher road speeds.

As utility vehicles have become popular for utilization as passenger vehicles, manufacturers of utility vehicles have incorporated many features into utility vehicles to enhance fuel efficiency, safety, and control at high speeds.

Utility vehicles are often designed for travel through rough terrain. Additionally, utility vehicles are generally designed to haul cargo, whether in a cargo compartment, a bed of the vehicle, or by towing cargo with a trailer. In order to meet these design requirements, utility vehicles are often provided with a vehicle body that is elevated greater than conventional passenger vehicles. In order to meet the fuel efficiency and safety standards while maintaining the elevated cargo compartments in utility vehicles, front end airflow management of utility vehicles is desirable.

Figure 1A:
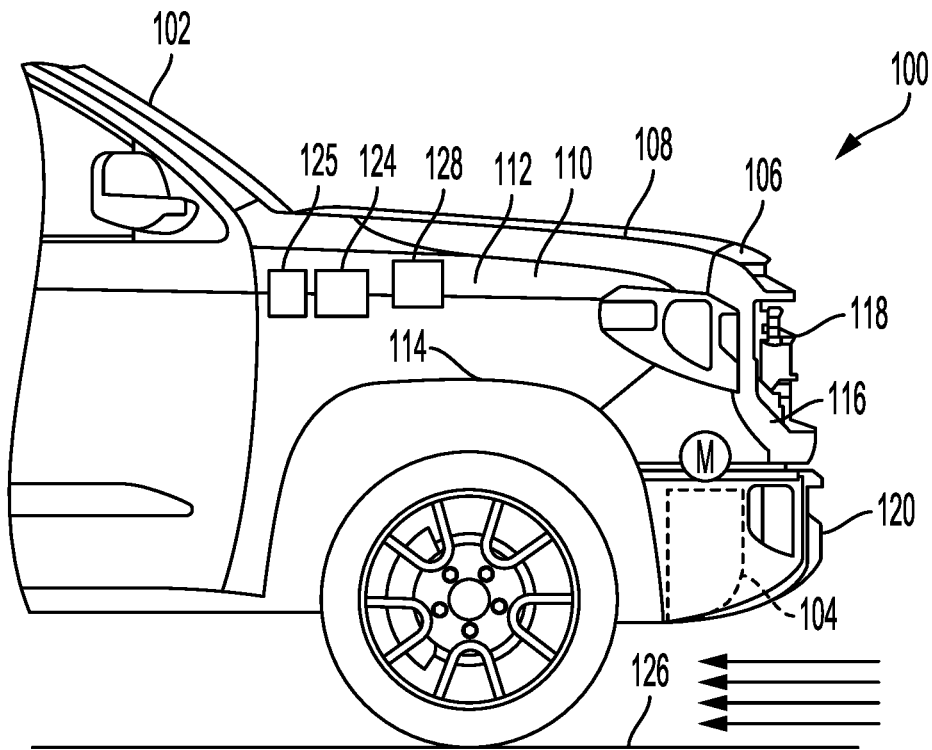
FIG. 1A and FIG. 1B are schematic side views of a vehicle including an aerodynamic system in a stowed position and a deployed position, respectively, according to an aspect of the invention.
Figure 1B:
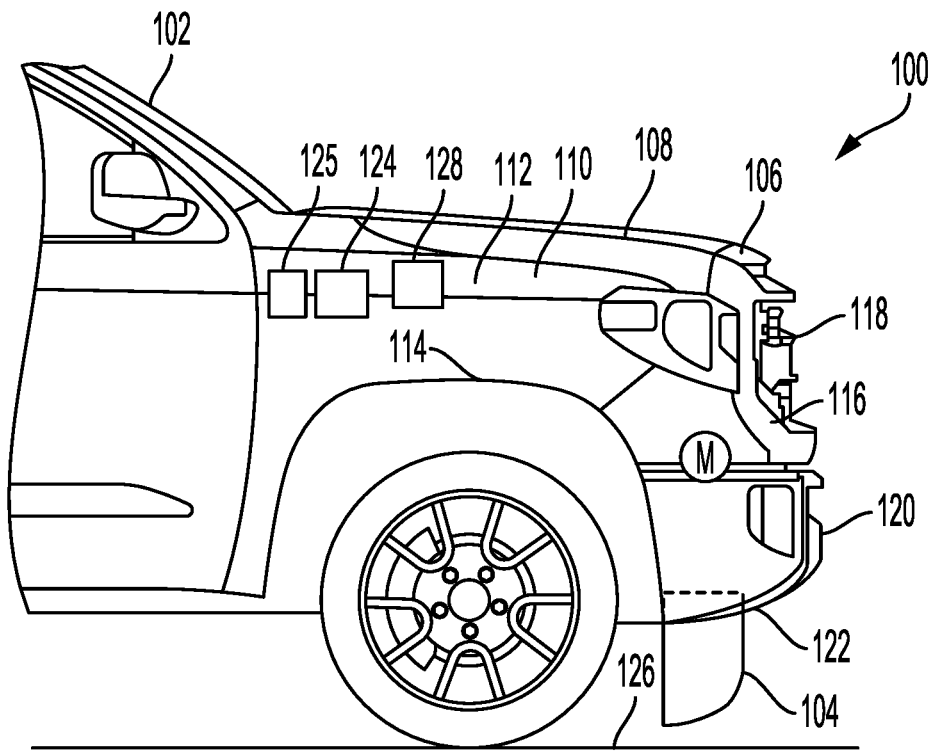

FIG. 1A and FIG. 1B are a schematic side views of a vehicle 102 including an aerodynamic system 100, according to an embodiment of the present disclosure. The aerodynamic system 100 can include an air dam 104 that may retrofit, couple to, include, or be included within the vehicle 102. In FIG. 1A, the air dam 104 is raised up to a stowed position. In FIG. 1B, the air dam 104 is in a deployed position where the air dam is lowered. A vehicle 102 is a conveyance capable of transporting a person, an object, or a permanently or temporarily affixed apparatus. The vehicle 102 may be a self-propelled wheeled conveyance, such as a car, a sport utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of electric/hybrid vehicle. Other examples of vehicles include bicycles, trains, planes, or boats, and any other form of conveyance that is capable of transportation. The vehicle 102 may be semi-autonomous or autonomous.

The front end 106 of the vehicle 102 includes an area forward of a passenger compartment in the longitudinal direction. The front end 106 includes a hood 108 defining a compartment 110 (e.g., an engine compartment or a front trunk) there beneath. The hood 108 can be a front hood of the vehicle (e.g., an engine bay hood or a front trunk "frunk" hood). The front end 106 also includes front quarter panels 112 on opposed lateral sides of the vehicle 102. Each quarter panel 112 defines a front wheel well 114. The quarter panel 112 is illustrated on a right side of the vehicle 102. The left quarter panel is generally a mirror image of the right quarter panel. The compartment 110 is located laterally between the quarter panels 112.

The front end 106 also includes a front fascia 116. The front fascia 116 is generally located forward of the hood 108 and quarter panels 112. The front fascia 116 includes the front grille 118 and a bumper 120. For vehicles 102 with an engine compartment, the front grille 118 can define an opening to the compartment 110 in order to allow airflow into the air induction system and for cooling of the engine compartment. For vehicles 102 with a front trunk, the front grille 118 can be sealed from the compartment 110 to prevent foreign objects (e.g., debris and moisture) from entering the compartment 110. The grille 118 may be designed for vehicle styling and aesthetic appeal and may also include the vehicle manufacturer logo or may have ornamental design characteristics.

The bumper 120 provides energy absorption in the event of a front impact crash. As illustrated, the bumper 120 may extend forward of the grille 118. However, in other embodiments, the bumper 120 may be generally flush with the grille 118.

As shown in FIG. 1B, in the deployed position, the air dam 104 is moved downward in the vertical direction in order to prevent airflow beneath the vehicle 102. In the deployed position, the front air dam 104 may extend an additional distance below a lower surface 122 of the bumper 120 or the front fascia 116. The air dam 104 may be offset from the front bumper 120 so that the air dam 104 is not flush with the bumper 120 in the vertical direction.

The front air dam 104 can be moved to the deployed position illustrated in FIG. 1B when road conditions are determined to be safe. Accordingly, the air dam 104 can be a deployable air dam. However, in some embodiments, the air dam 104 can be a fixed air dam that is fixed in the deployed position as illustrated in FIG. 1B.

The aerodynamic system 100 can further include one or more processors, such as an electronic control unit (ECU) 124 (also referred to herein as an air dam controller) or other processor and a memory 125. The ECU 124 may be implemented as a single ECU or as multiple ECUs. The ECU 124 may be electrically coupled to some or all of the other components within the vehicle 102, such as the air dam 104 and/or components thereof. The ECU 124 may include one or more processors or controllers specifically designed for detecting, monitoring, and/or controlling the speed of vehicle 102. The ECU 124 may include one or more processors or controllers specifically designed for detecting and/or monitoring a position of the front hood 108. The ECU 124 may include one or more processors or controllers specifically designed for detecting, monitoring, and/or controlling a position of the air dam 104 and/or components thereof.

The ECU 124 may be wired or wirelessly coupled to various components of the aerodynamic system 100, such as the one or more sensors 128, the air dam 104, and/or components thereof. For example, the ECU 124 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The ECU 124 may transmit data to and receive data from the components via the communication port. The communication port may be connected to the various components via a Dedicated Short-Range Communication (DSRC) network, a local area network (LAN), a wide area network (WAN), a cellular network, the Internet, or combination thereof, that connects, couples and/or otherwise communicates among the multiple components.

The memory 125 may be coupled to the ECU 124 and store instructions that the ECU 124 executes. The memory 125 may include one or more of a Random Access Memory (RAM) or other volatile or non-volatile memory. The memory 125 may be a non-transitory memory or a data storage device, such as a hard disk drive, a solid-state disk drive, a hybrid disk drive, or other appropriate data storage, and may further store machine-readable instructions, which may be loaded and executed by the ECU 124 or other processor. For example, the memory 125 can store instructions in accordance with any of the methods described herein for monitoring and/or controlling various components of the aerodynamic system 100 as described herein.

The ECU 124 can be configured to automatically actuate the air dam 104 between the deployed position and the stowed position. In the deployed position, the air dam 104 is lowered to a closer distance to the driving surface 126. The air dam 104 prevents some of the air from flowing beneath the vehicle and along the vehicle underbody by redirecting flow around the vehicle instead. In the stowed position, the air dam 104 is located substantially above the driving surface 126 and does not generally redirect airflow.

The air dam 104 may be capable of being positioned at various different deployed positions based on vehicle speed or environmental conditions, for example. The ECU 124 may control the deployed position of the air dam 104 based on speed or road obstacles. For example, the air dam 104 may be raised to the stowed position if the vehicle is being driven at lower speeds where there is not large drag, or if an obstacle is detected that could potentially damage the air dam 104.

The aerodynamic system 100 may also include one or more sensors 128. For example, the one or more sensors 128 can include a vehicle sensor for detecting a speed of the vehicle 102. The one or more sensors 128 can include a vehicle sensor for detecting an externally located object, which may be any type of device used for detecting distance between the vehicle 102 and an externally located object, such as radar, a camera, LIDAR or even vehicle-to-vehicle communication. The one or more sensors 128 may also include sensors for detecting uneven road conditions though vibration sensors or sensors associated with the suspension system, for example. The one or more sensors 128 can further include a hood position sensor for detecting when the front hood 108 is moved to an open, or partially open, position. The one or more sensors 128 are in communication with the ECU 124 and provide data signals to the controller 124.

Figure 2:
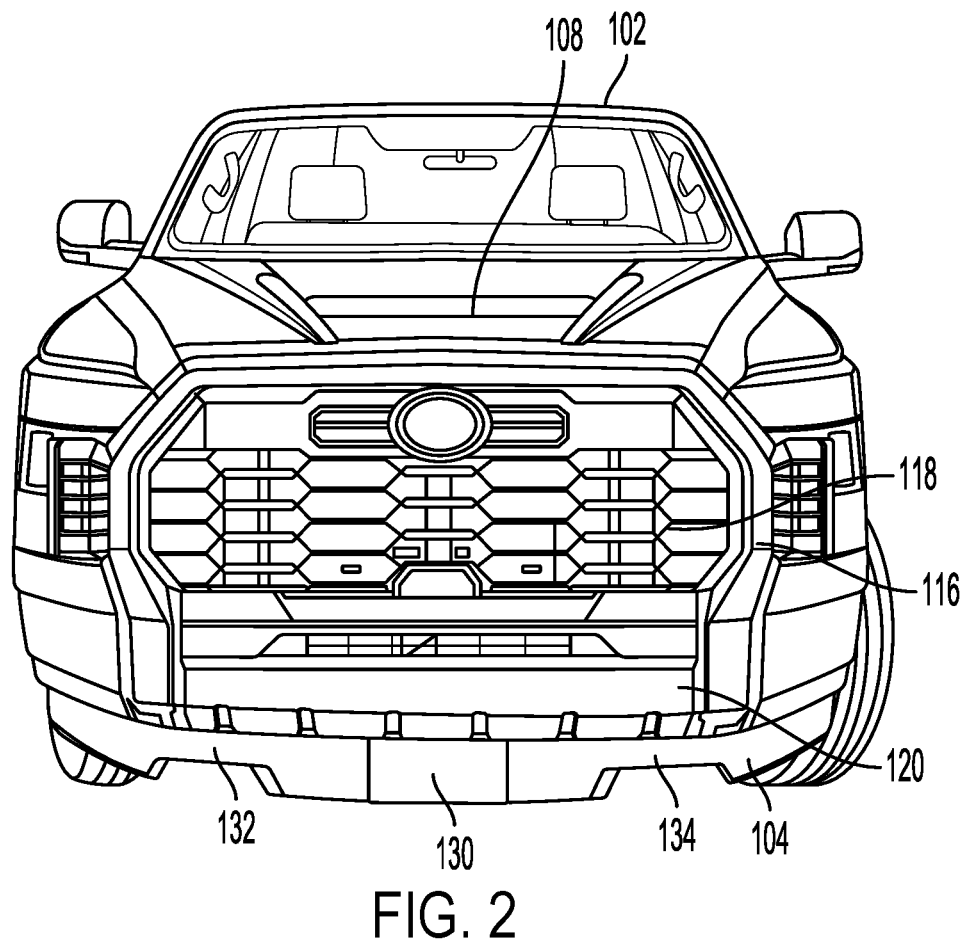
FIG. 2 is a schematic front view of a vehicle including an aerodynamic system having a multi-panel air dam in a deployed position according to an aspect of the invention.

FIG. 2 is a front schematic view of the vehicle 102 having the aerodynamic system 100. The air dam 104 can have a plurality of air dam panels, such as a first air dam panel 130, a second air dam panel 132, and a third air dam panel 134. The second air dam panel 132 can be a right side air dam panel and the third air dam panel 134 can be a left side air dam panel. The second air dam panel 132 can be generally a mirror image of the third air dam panel 134. The first air dam panel 130 can be located between the second air dam panel 132 and the third air dam panel 134. Accordingly, the first air dam panel 130 can be a center air dam panel. The first air dam panel 130 can be moved with respect to the second air dam panel 132 and the third air dam panel 134 to a step mode or position. When the air dam panels 130, 132, 134 are in the deployed position, for example as illustrated, the air dam panels 130, 132, 134 can form a generally seamless and/or contiguous air dam 104 that at least partially extends a distance below a bottom surface of the front bumper 120 to reduce airflow beneath the vehicle 102. For example, the air dam panels 130, 132, 134 can be flush with one another and/or have overlapping edges that form a segmented air dam 104 that extends along the underside of the front bumper 120, for example between 80% and 100% of the total width of the front bumper 120.

Figure 3:
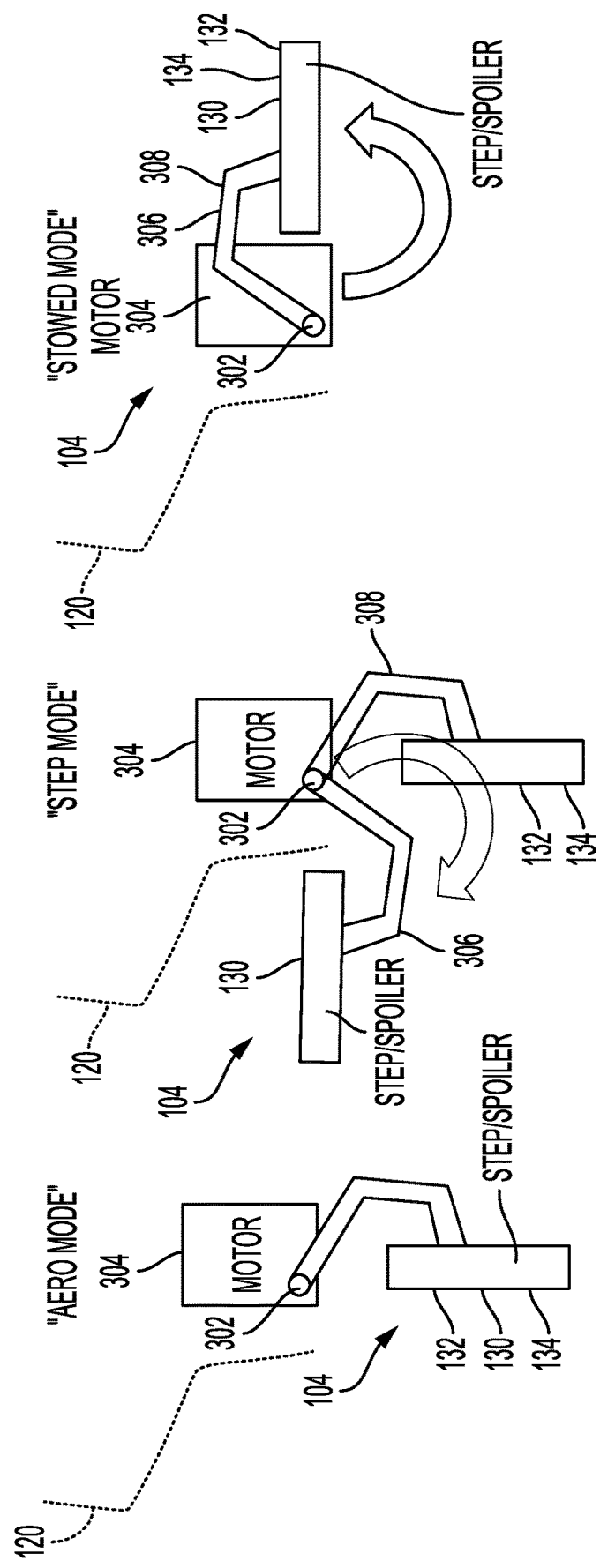
FIG. 3A, FIG. 3B, and FIG. 3C are schematic side views of an aerodynamic system in a deployed or aerodynamic position, a step position, and a stowed position, respectively, according to an aspect of the invention.

FIG. 3A, FIG. 3B, and FIG. 3C illustrate the air dam 104 in an aerodynamic or deployed position, a step position, and a stowed position, respectively. The air dam 104 can be rotated about a pivot 302 between the deployed or aerodynamic position (see FIG. 3A) and a stowed position (see FIG. 3C). The pivot 302 can define a generally horizontal rotational axis of the air dam 104, which can extend in the lateral direction with respect to a vehicle. The first air dam panel 130 can be rotated about the pivot 302 with respect to the second air dam panel 132 and the third air dam panel 134 to the step position (see FIG. 3B). Accordingly, the second and third air dam panels 132, 134 can remain stationary while the first air dam panel 130 moves to the step position. In the step position, the first air dam panel 130 acts as a step for a user to step on to reach into the front compartment (e.g., compartment 110 of FIG. 1A) of the vehicle. The first air dam panel 130 can rotate independent of the second and third air dam panels 132, 134. Accordingly, the first air dam panel 130 can be coupled to a motor 304 via a first linkage 306 and the second and/or third air dam panels 132, 134 can be coupled to the motor 304 via a second linkage 308. In other embodiments, the first air dam panel 130 is operatively coupled to a first motor 304 and the second and/or third air dam panels 132, 134 are operatively coupled to a second motor 304. Stated differently, the air dam panels 130, 132, 134 can be operated using a common motor or using separate motors. The motor 304 can include a spindle drive actuator, an electric motor and shaft, or any other suitable actuator and/or motor for moving (e.g., rotating and/or translating) one or more panels (air dam panel 130, 132, or 134) of the air dam 104. The motor 304 can be powered by a vehicle battery or a separate battery or power source. The air dam panels 130, 132, and 134 can be rotated about a common pivot 302 or can be rotated about different pivots. In various embodiments, the first air dam panel 130 operates independently of the second and third air dam panels 132, 134 and the second and third air dam panels 132, 134 simultaneously operate in unison. The air dam panels 130, 132, and 134 can move together between the stowed position and the aerodynamic position.

When the first air dam panel 130 is moved to the step position, the second and third air dam panels 132, and 134 can be in the aerodynamic position, as illustrated in FIG. 3B, or can be in the stowed position, as illustrated in FIG. 3C.

In various embodiments, the first air dam panel 130 can be manually rotated from the aerodynamic position to the step position. For example, the motor 304 can move the first air dam panel 130 from the stowed position (FIG. 3C) to the aerodynamic position (FIG. 3A), and a user can manually rotate the step from the aerodynamic position (FIG. 3A) to the step position (FIG. 3B), for example by pulling the step/air dam panel 130.

Figure 4:
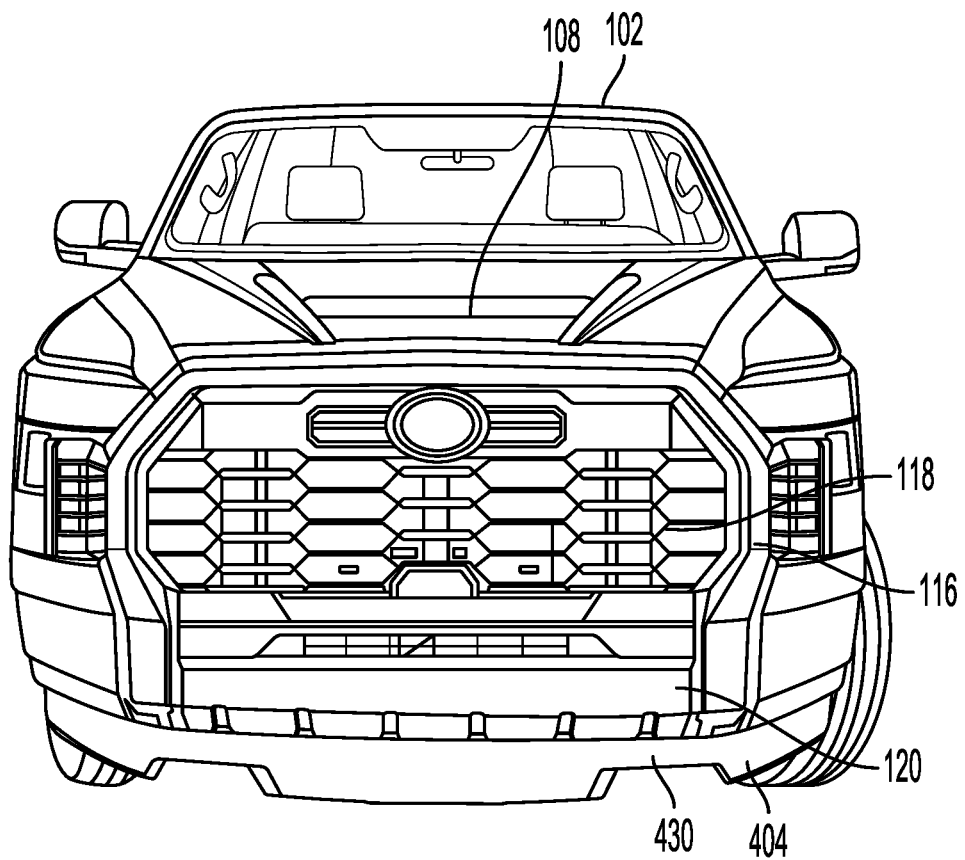
FIG. 4 is a schematic front view of a vehicle including an aerodynamic system having a single-panel air dam in a deployed position according to an aspect of the invention.

FIG. 4 is a front schematic view of the vehicle 102 having an air dam 404. The air dam 404 can be similar to the air dam 104 illustrated in FIG. 2, except that the air dam 404 is a single panel 430 configured to move between the stowed position, the aerodynamic or deployed position, and the step position. Accordingly, the air dam panel 430 can be moveably coupled to the vehicle 102 and can act as both an air dam and a step for accessing a front compartment of the vehicle 102.

Figure 5:
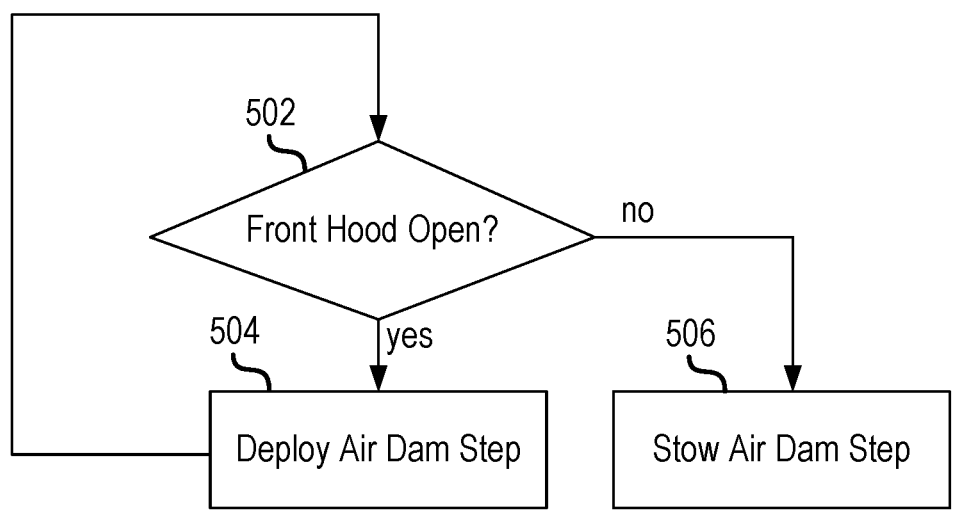
FIG. 5 is a flow chart for a method for controlling an active aerodynamic system including an air dam according to an aspect of the invention.

FIG. 5 is a flow diagram of a process 500 for controlling an air dam 104. One or more computers or one or more data processing apparatuses, for example, the ECU 124 of the aerodynamic system 100, appropriately programmed, may implement the process 500.

The electronic control unit 124 can determine whether the front vehicle hood 108 is open, or partially open (502). For example, the electronic control unit 124 can receive a front hood position signal from the one or more position sensors 128 (e.g., a hood position sensor) indicating that the front hood 108 is open, or is no longer in a closed position, or that the front hood latch is in an unlatched position, each of which can indicate that the front hood 108 is open or is in the process of being opened.

In response to detecting that the front hood 108 is open, or is in the process of being opened, the electronic control unit 124 can deploy the air dam step, e.g., the first air dam panel 130 to the step position (504). For example, the electronic control unit 124 can control the motor 304 to rotate the first air dam panel 130 to the step position, as illustrated in FIG. 3B. The electronic control unit 124 can continue to monitor whether the front hood 108 is open (502). In response to the electronic control unit 124 detecting that the front hood 108 is no longer open, the electronic control unit 124 can command the motor 304 to rotate the air dam step (e.g., the first air dam panel 130) to the stowed position (506).

FIG. 6 illustrates an air dam 604 having a first air dam panel 630 pivotally coupled to a second air dam panel 632. The first air dam panel 630 can be pivotally coupled to a lower side of the second air dam panel 632. The air dam 604 can further include a third air dam panel (similar to third air dam panel 134 of FIG. 2 through FIG. 3C). For example, the first air dam panel 630 can be a center panel, the second air dam panel 632 can be a left (or a right) side panel, and the third air dam panel can be a right (or a left) side panel. The first air dam panel 630 can be pivotally coupled to the second air dam panel 632 via a hinge or pivot 602 located at the bottom side of the second air dam panel 632. Stated differently, the lower side of the first air dam panel 630 can be pivotally coupled to the second air dam panel 632. In this manner, the first air dam panel 630 can be rotated forward and downward to the step position 693. Accordingly, the first air dam panel 630 can be mounted to the second air dam panel 632 (and/or the third air dam panel). When rotating from the aerodynamic position 692 to the step position 693, the rear-facing surface of the first air dam panel 630 can be rotated to an upward-facing direction, whereby a user can step onto the rear-facing surface (now an upward-facing surface). As described herein, the second air dam panel 632 and the first air dam panel 630 can be actively actuated between the stowed and deployed positions via one or more actuators/motors.

In various embodiments, the first and second air dam panels 630, 632 can be rotatable between a stowed position 691 and a deployed or aerodynamic position 692. For example, the first and second air dam panels 630, 632 can be rotated about a pivot 603 from the stowed position 691 to the deployed or aerodynamic position 692. The first air dam panel 630 can be rotated about the pivot 602 with respect to the second air dam panel 632 to the step position 693. In the step position 693, a user can step up onto the first air dam panel 630 to better access a front compartment 610 of the vehicle. In various embodiments, the first air dam panel 630 is configured to be automatically rotated to the step position 693 using an actuator/motor. In various embodiments, the first air dam panel 630 is configured to be manually rotated to the step position 693. For example, a user can manually pull the first air dam panel 630 to the step position 693.

In various embodiments, the first and second air dam panels 630, 632 can be linearly translated between a stowed position 694 and the deployed or aerodynamic position 692.

FIG. 7 illustrates an air dam 704 having a first air dam panel 730. The first air dam panel 730 can be similar to first air dam panel 630 of FIG. 6, except that the first air dam panel 730 rotates about its upper end. For example, the first air dam panel 730 can be pivotally coupled at its upper end to one or more adjacent air dam panels (e.g., see air dam panel 132 and air dam panel 134 of FIG. 2). In various embodiments, the first air dam panel 730 can be pivotally coupled to a frame of the vehicle. In this manner, the first air dam panel 730 can be rotated forward and upward to the step position 793. When rotating from the aerodynamic position 792 to the step position 793, the forward-facing surface of the first air dam panel 730 can be rotated to an upward-facing direction, whereby a user can step onto the forward-facing surface (now an upward-facing surface). In the step position 793, a user can step up onto the first air dam panel 730 to better access a front compartment 710 of the vehicle. The first air dam panel 730 can further be rotated from a stowed position 791 to a deployed or aerodynamic position 792.

As described herein, the first air dam panel 730 can be actively actuated between the stowed and deployed positions via one or more actuators/motors. In various embodiments, the first air dam panel 730 can be configured to be manually rotated to the step position 793.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle air dam system, comprising:
   a front hood for covering a vehicle compartment, the front hood is rotatable between a closed position and an open position;
   an air dam including a first air dam panel adapted to be mounted adjacent a front bumper of a vehicle;
   an actuator operatively coupled to the first air dam panel and configured to move the first air dam panel relative to the front bumper;
   a front hood position sensor configured to detect a position of the front hood; and
   an electronic control unit electrically coupled to the front hood position sensor and configured to:
      receive a first front hood position signal indicating that the front hood is no longer in the closed position; and
      in response to receiving the first front hood position signal, control the actuator to move the first air dam panel from a first position to a second position wherein the first air dam panel is configured as a step for a user to access the vehicle compartment.

2. The vehicle air dam system of claim 1, wherein the first position is an aerodynamic position, in which the first air dam panel at least partially extends a distance below a bottom surface of the front bumper to reduce airflow beneath the vehicle.

3. The vehicle air dam system of claim 1, wherein the first position is a stowed position, in which the first air dam panel is at least partially concealed by the front bumper.

4. The vehicle air dam system of claim 1, wherein the first air dam panel is configured to rotate about a pivot between the first position and the second position.

5. The vehicle air dam system of claim 1, wherein the air dam further includes a second air dam panel adapted to be mounted adjacent the front bumper, and the first air dam panel is moveable with respect to the second air dam panel.

6. The vehicle air dam system of claim 5, wherein the second air dam panel is configured to move between an aerodynamic position, in which the second air dam panel at least partially extends a distance below a bottom surface of the front bumper to reduce airflow beneath the vehicle, and a stowed position, in which the second air dam panel is at least partially concealed by the front bumper.

7. The vehicle air dam system of claim 5, wherein the first air dam panel is immediately adjacent to the second air dam panel when the first air dam panel and the second air dam panel are both in an aerodynamic position, and the first air dam panel is configured to move with respect to the second air dam panel when the first air dam panel moves to the second position.

8. The vehicle air dam system of claim 5, wherein the air dam further includes a third air dam panel adapted to be mounted adjacent the front bumper, the first air dam panel is moveable with respect to the third air dam panel, and the first air dam panel is located between the second air dam panel and the third air dam panel.

9. The vehicle air dam system of claim 1, wherein the electronic control unit is further configured to:
 receive a second front hood position signal indicating that the front hood is in the closed position; and
 in response to receiving the second front hood position signal, control the actuator to move the first air dam panel from the second position to a stowed position.

10. A method of controlling an air dam for a vehicle, comprising:
 receiving, by a processor, a first front hood position signal indicating that a front hood for the vehicle is no longer in a closed position; and
 in response to receiving the first front hood position signal, controlling, by the processor, an actuator to move a first air dam panel from a first position to a second position wherein the first air dam panel is configured as a step for a user to access a vehicle compartment.

11. The method of claim 10, further comprising:
 receiving, by the processor, a second front hood position signal indicating that the front hood is in the closed position; and
 in response to receiving the second front hood position signal, controlling, by the processor, the actuator to move the first air dam panel from the second position to a stowed position.

12. The method of claim 10, wherein the step of controlling the actuator to move the first air dam panel from the first position to the second position includes rotating the first air dam panel about a pivot.

13. The method of claim 10, wherein the step of controlling the actuator to move the first air dam panel from the first position to the second position includes rotating the first air dam panel with respect to a second air dam panel.

14. The method of claim 10, wherein the step of controlling the actuator to move the first air dam panel from the first position to the second position includes rotating the first air dam panel forward and downward.

15. The method of claim 10, wherein the step of controlling the actuator to move the first air dam panel from the first position to the second position includes rotating the first air dam panel forward and upward.

16. A vehicle air dam system, comprising:
 an air dam including a first air dam panel adapted to be mounted adjacent a front bumper of a vehicle, the first air dam panel is configured to move between an aerodynamic position, in which the first air dam panel at least partially extends a distance below a bottom surface of the front bumper to reduce airflow beneath the vehicle, and a step position, wherein the first air dam panel is configured as a step.

17. The vehicle air dam system of claim 16, wherein the first air dam panel is further configured to move to a stowed position, in which the first air dam panel is at least partially concealed by the front bumper.

18. The vehicle air dam system of claim 16, wherein the first air dam panel is configured to rotate about a pivot between the aerodynamic position and the step position.

19. The vehicle air dam system of claim 16, further comprising a second air dam panel adapted to be mounted adjacent the front bumper, the second air dam panel is configured to move between the aerodynamic position, in which the second air dam panel at least partially extends the distance below the bottom surface of the front bumper to reduce airflow beneath the vehicle, and a stowed position, in which the second air dam panel is at least partially concealed by the front bumper.

20. The vehicle air dam system of claim 19, wherein the first air dam panel is located immediately adjacent to the second air dam panel when the first air dam panel and the second air dam panel are both in the aerodynamic position, and the first air dam panel is configured to move with respect to the second air dam panel when the first air dam panel moves to the step position.

* * * * *